Oct. 6, 1964         E. A. WAHL         3,151,782
MATERIAL FEEDER HAVING VIBRATORY MEANS
Filed March 20, 1962         2 Sheets-Sheet 1
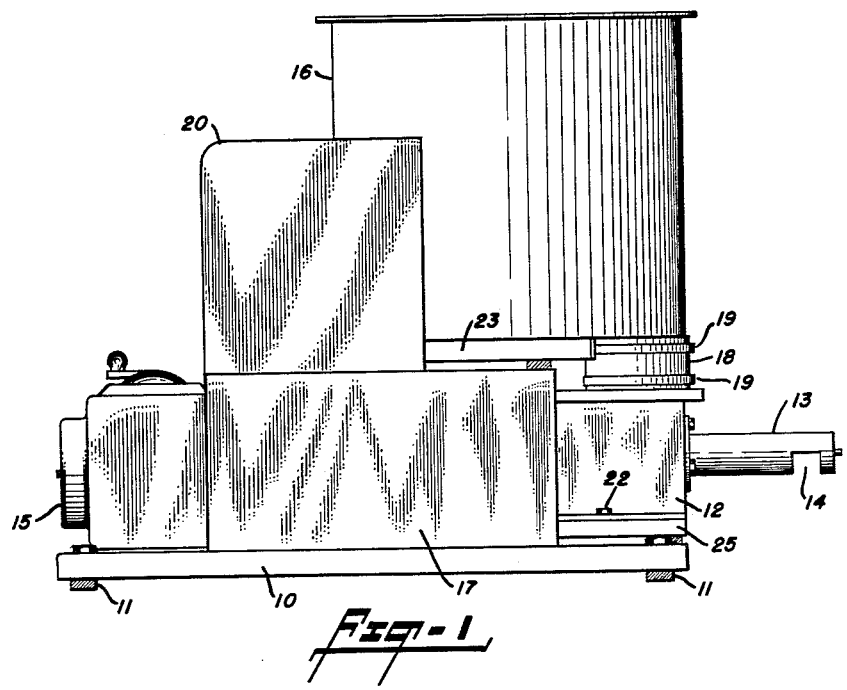
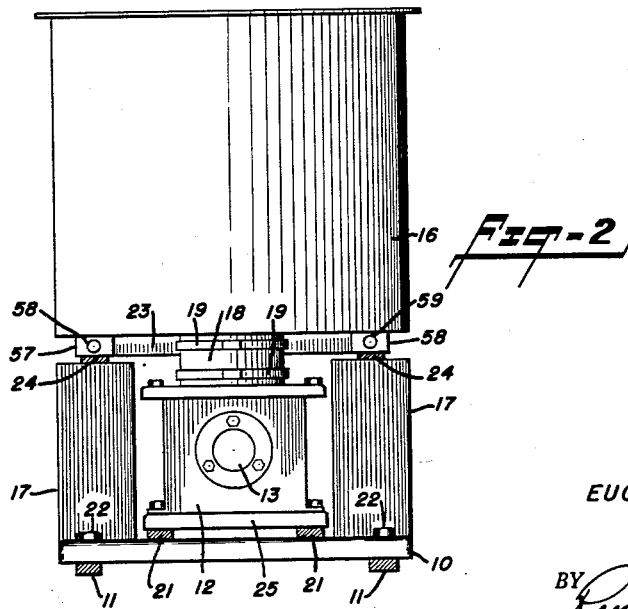
EUGENE A. WAHL
INVENTOR.
BY
ATTORNEY Oct. 6, 1964      E. A. WAHL      3,151,782
MATERIAL FEEDER HAVING VIBRATORY MEANS
Filed March 20, 1962      2 Sheets-Sheet 2
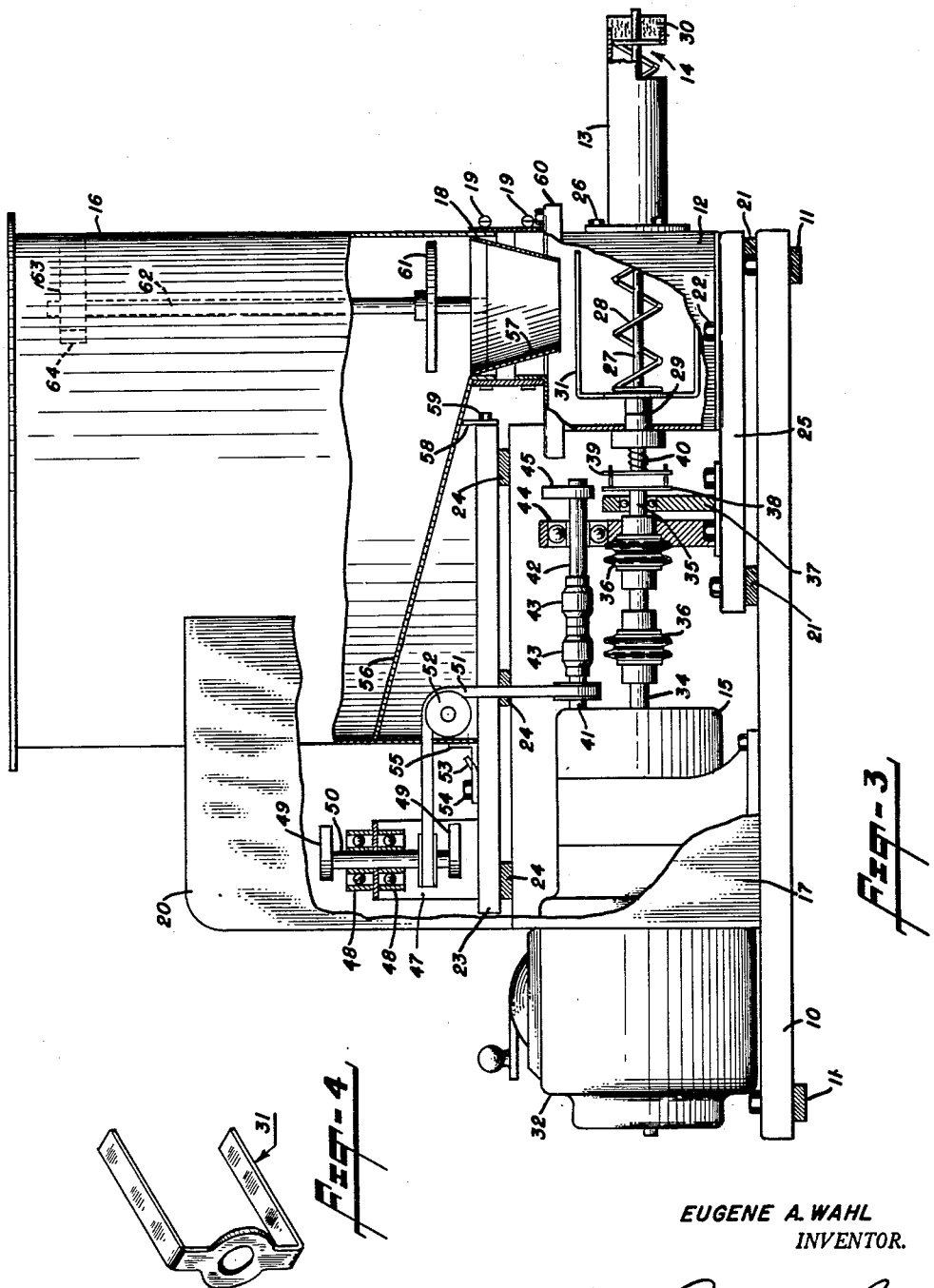
EUGENE A. WAHL
INVENTOR.
BY
ATTORNEY

United States Patent Office 3,151,782
Patented Oct. 6, 1964

3,151,782
MATERIAL FEEDER HAVING VIBRATORY MEANS
Eugene A. Wahl, 294 Forest Ave., Glen Ridge, N.J.
Filed Mar. 20, 1962, Ser. No. 181,034
11 Claims. (Cl. 222—202)

This invention relates to automatic powder feeding apparatus and more particularly to an improved apparatus for continuously dispensing powdered, granular, or the like material at a precise, predetermined rate.

Material feeders are employed to discharge material, at a constant, predetermined rate, into various processes such as, for example, chemicals into a stream of water for purification or treatment. Feeders of this class, and to which this invention is particularly directed, are of the volumetric type wherein the material handled is metered by volume. In general, volumetric feeders include a rotating screw, or auger, which displaces a certain volume of the material toward a discharge opening of the apparatus. Such feeders require that the material be supplied to the screw from an associated hopper in a positive manner since the accuracy of the apparatus is determined by the completeness with which the material is supplied to the screw and dispensed thereby.

Materials have widely differing flow characteristics as, for example, free flowing granular dry powders and sticky amorphous powders. In consequence, many materials will not readily flow from the hopper to the dispensing element due to bridging, or will not flow out of the dispensing element due to sticking. Also, materials having varying bulk densities due to aeration present a metering problem, since less material is discharged from the feeder when the material contains an excess of air than when the material contains a normal, or lesser amount of air. These problems are overcome by a vibrated, screw type feeder disclosed in my United States Patent No. 2,957,608, dated October 25, 1960, and entitled Powder Feeder. The present invention constitutes an improvement over the patented feeder. In brief, the present invention includes a rotating screw dispensing element which is continuously vibrated in a plane normal to the screw axis and wherein the hopper is cylindrical, rather than conical, thereby providing increased hoppering capacity. Means are provided for positively vibrating the hopper and for the quick and easy removal, for the purpose of cleaning and washing, of all parts which normally are in contact with the material.

An object of this invention is the provision of a feeder for powdered, granular, or the like materials, which feeder is simple, compact, of rugged construction, and which functions accurately and reliably under the most adverse conditions.

An object of this invention is the provision of a feeder having a rotating screw extending from a receiving chamber to a dispensing opening, a hopper removably positioned over the dispensing chamber and means for vibrating the screw and the hopper in different planes.

An object of this invention is the provision of apparatus for dispensing powdered or granular material at a predetermined constant rate, comprising a rotating screw feeder, a storage hopper for supplying material to the feeder, means vibrating the hopper and the feeder, and means removably securing the hopper and the feeder in operative relationship.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a side view of apparatus made in accordance with this invention;

FIGURE 2 is a front elevational view thereof;

FIGURE 3 is a side, elevational view of the apparatus drawn to larger scale than FIGURES 1 and 2, and with certain parts broken away and certain parts shown in cross section; and FIGURE 4 is an enlarged isometric view of the wiper bar which rotates in the feeder trough with the dispensing screw.

Reference is first made to FIGURES 1 and 2 of the drawings. The apparatus is supported on a rigid base 10 provided with rubber feet 11. The feeder proper comprises a material-receiving chamber, or trough, 12 having a tube 13 extending therefrom, said tube being provided with a discharge opening 14. As will be described hereinbelow, with specific reference to FIGURE 3, a rotatable, dispensing screw, or auger, extends through the tube 13 and into the trough 12, whereby rotation of the screw, by the motor drive unit 15, results in movement of the material from the trough, through the tube and out of the discharge opening. The size of the screw and the rotational speed thereof determine the rate at which the material is dispensed from the device. A cylindrical hopper 16 is supported above the feeder on a pair of side plates 17, secured to and extending upwardly from the base 10. Material stored in the hopper is continuously supplied to the feeder trough through a common passageway enclosed within the flexible sleeve, or boot 18, that is secured in place by a pair of quick-disconnect ring clamps 19. A guard housing 20 encloses the mechanism for imparting vibrations to the hopper. It will be noted that the feeder trough is carried by a sub-base 25 which, in turn, is supported on the main base 10 by resilient mountings 21 and cooperating bolts 22. Similarly, the hopper 16 is carried by a platform 23 which, in turn, is supported on the side plates 17 by resilient mountings 24. Consequently, the hopper and the feeder can be vibrated independently of each other.

Referring, now, to FIGURE 3, a shaft 27, having the flights 28 secured thereto, constitutes the rotatable dispensing element, said shaft being centrally disposed within the tube 13 and rotatable in the bearings 29 and 30. Also, secured to the shaft 27, and rotatable therewith, is a U-shaped wiper bar 31, see also FIGURE 4.

The electric drive motor 15 and a variable-drive, gear-reduction unit 32, form an integral unit that is rigidly secured to the base 10. The motor shaft 34 is coupled to a drive shaft 35 by means of the flexible couplings 36, said drive shaft being rotatable in a bearing carried by a vertical suport 37 that is secured to the feeder sub-base 25. Coupling of the drive shaft 35 to the feeder shaft 27 is accomplished by a plate 38 secured to the drive shaft and having spaced, axial pins which cooperate with a coupling bar 39 that is attached to the feeder shaft. The feeder bar is biased toward the plate 38 by a compression spring 40. Upon rotation of the drive shaft 35, the pins extending from the plate 38 engage opposite side edges of the bar 39 thereby rotating the feeder shaft. With this arrangement, the dispensing feeder may be removed from the rest of the apparatus by removal of the bolts 22 which secure the feeder to the sub-base 25, without disturbing the drive means for the feeder screw.

A second power-driven shaft 41 extends from the gear-reduction unit 32 and is coupled to a shaft 42 by flexible couplings 43, said shaft 42 being rotatable in a bearing carried by the support 44 which also is secured to the sub-base 25. An eccentrically-mounted weight 45 is secured to the shaft 42 whereby rotation of the shaft imparts vibrations to the feeder in directions normal to the axis of the feed screw.

The platform 23 is supported on the side plates 17 (see also FIGURE 2) by resilient mountings 24 and is secured in relative fixed position thereto by suitable bolts not visible in the drawings. This platform has secured thereto a vertical bracket 47 carrying the bearings 48. A pair of eccentric weights 49 are secured to the shaft 50, as by set screws, with the weights located on opposite sides of the bearings 48. The center of mass of each of the weights 49 is displaced from the shaft axis in the same direction whereby rotation of the shaft results in a vibration of the platform 23 in directions normal to the axis of the hopper 16, rotation of the shaft 50 being effected by a belt 51 passing over suitable idler pulleys 52 and pulleys secured to the shafts 41 and 50, as shown.

Means are provided whereby the hopper 16 can be secured to or removed from the platform 23 easily and conveniently. A plurality of clips 53 are secured in fixed, proper position on the platform as by bolts 54. These clips have upturned free ends for receiving the horizontal leg of an L-shaped bracket 55 which is welded, or otherwise secured to the outer wall of the hopper. It will be noted that the hopper has an inclined bottom 56 communicating with a tapered discharge opening 57 which extends into the feeder trough 12. Welded to the hopper bottom are two tabs 58 (see also FIGURE 2), each tab being provided with a hole that is aligned with a threaded hole formed in the front wall of the platform 23. It will be clear that the hopper is placed in position by sliding the L-shaped bracket 55 under the cooperating clips 51 and then fastening the tabs 58 to the platform by the two bolts 59. A reversal of this simple procedure permits removal of the hopper for cleaning, as desired. When the hopper is secured in position, it will be apparent that it will vibrate along the platform 23. The flexible boot 18, which is disposed over circular flanges provided on the hopper and on the cover 60 of the feeder trough and which is secured in position by the clamping rings 19, prevents dust from entering the atmosphere during operation of the apparatus. For this same purpose, the hopper may be closed by a removable cover not shown in the drawings.

When the apparatus is in operation, the feeder and the hopper are vibrated continuously, the feeder vibrations being in a plane normal to the feeder screw axis and the hopper vibrations being in a plane normal to the hopper axis. Inasmuch as the vibration-producing weights are driven by the output shaft of the gear-reduction unit, the vibration frequency of the hopper and feeder and the rotational speed of the feed auger can be adjusted independently of each other. The described arrangement provides for a positive flow of the material from the hopper to the feeder trough and from the trough to the discharge opening 14. Such arrangement will handle dry materials without bridging or flooding and will dispense such materials at a constant, precise rate having an accuracy far exceeding that possible with prior apparatus of this class. In the case of certain free-flowing materials, it may be desirable to prevent compacting of the material within the feeder trough due to the added pressure applied to the material when the hopper is full. This is done by means of an adjustable baffle 61 carried by a shaft 62 which is vertically adjustable in a mounting bracket 63, that is, the rod is positionable to provide a desired spacing of the baffle relative to the hopper discharge opening and then secured in such postion by a set screw 64. In the case of other materials, which may tend to compact within the trough, I provide the wiper bar 31 (see also FIGURE 4) which rotates with the feeder screw thereby preventing a bridging of the material within the trough.

Having now described my invention, what I desire to protect by Letters Patent of the United States is set forth in the following claims.

I claim:
1. A material feeder comprising,
   (a) a main base,
   (b) a first sub-base carried by the main base on resilient mountings,
   (c) a trough having a dispensing tube extending therefrom, said tube being provided with a discharge opening,
   (d) means removably securing the trough to the said first sub-base,
   (e) a screw element rotatably disposed within the said tube and trough,
   (f) a second sub-base carried by the main base,
   (g) a cylindrical hopper having a sloping bottom terminating in a hopper discharge opening,
   (h) means removably securing the hopper to the said second sub-base with the hopper discharge opening communicating with the trough,
   (i) a first shaft carrying an eccentric weight and extending in a direction normal to the axis of the said screw element,
   (j) a second shaft carrying an eccentric weight and extending in a direction normal to the hopper axis,
   (k) drive means carried by the main base,
   (l) means mechanically coupling said drive means to the said screw element and said first and second shafts for simultaneous rotation thereof.

2. The invention as recited in claim 1, including a U-shaped member disposed within the trough, said member having a base secured to the screw element and side arms spaced from and substantially parallel to said screw element.

3. The invention as recited in claim 1, including a baffle plate disposed within and carried by the hopper and adjustable means for spacing the baffle plate a predetermined distance from the hopper discharge opening.

4. The invention as recited in claim 1, wherein the said drive means is an electric motor having a drive shaft and a gear-reduction unit driven by the motor and having an output shaft, and wherein the said motor drive shaft is coupled to the screw element and the said output shaft is coupled to the said first and second shafts.

5. The invention as recited in claim 1, wherein the said first shaft is rotatable in a bearing carried by the said first sub-base, and wherein the said second shaft is rotatable in a bearing carried by the said second sub-base.

6. The invention as recited in claim 5, wherein the said first and second shafts are coupled together for simultaneous rotation by a flexible belt.

7. A material feeder comprising,
   (a) a main base,
   (b) a first sub-base carried by the main base on resilient mountings,
   (c) a trough having a horizontal tube extending therefrom, said tube being provided with a dispensing opening,
   (d) means removably securing the trough to the first sub-base,
   (e) a screw element rotatably disposed within the said tube and trough, said element including a shaft extending through an opening formed in a side wall of the trough,
   (f) a motor secured to the main base and having a drive shaft axially aligned with the screw element and extending through a bearing,
   (g) means securing the said bearing in fixed position on the said first sub-base,
   (h) cooperating coupling members carried by the end of the motor drive shaft and the screw element shaft, said coupling elements being automatically separable upon removal of the trough from the first sub-base, (i) a second sub-base carried by the main base on resilient mountings, (j) a vertical cylindrical hopper having a sloping bottom terminating in a hopper discharge opening, (k) means removably securing the hopper to the second sub-base, and (l) means for simultaneously vibrating the hopper in a plane normal to its axis and the screw element normal to its axis.

8. The invention as recited in claim 7, wherein the means removably securing the hopper to the second sub-base comprises a pair of clip members secured to the second sub-base, an L-shaped bracket member secured to the outer wall of the hopper and slidable under the said clip members, a bracket secured to the hopper bottom, and means for firmly securing the said bracket to the said second sub-base.

9. The invention as recited in claim 8, including a baffle plate disposed within the hopper, and adjustable means for positioning the baffle plate a predetermined, spaced distance from the hopper discharge opening.

10. The invention as recited in claim 7, including a cover closing the trough and having an opening formed therein, and wherein the hopper discharge opening is defined by a conical member extending into the opening formed in the trough cover.

11. The invention as recited in claim 10, including a flexible tubular member surrounding the said conical member.

References Cited in the file of this patent
UNITED STATES PATENTS

| | | |
|---|---|---|
| 1,066,656 | Richardson | July 8, 1913 |
| 2,101,561 | Rapp | Dec. 7, 1937 |
| 2,531,305 | Smith | Nov. 21, 1950 |
| 2,800,252 | Wahl | July 23, 1957 |
| 2,827,157 | Tsuchiya et al. | Mar. 18, 1958 |
| 2,988,249 | Wahl | June 13, 1961 |
| 3,050,215 | Williams | Aug. 21, 1962 |